J. A. WARREN.
NUT LOCK.
APPLICATION FILED APR. 2, 1918.

1,302,105.

Patented Apr. 29, 1919.

Inventor
J. A. Warren.

By
Attorneys

UNITED STATES PATENT OFFICE.

JAMES A. WARREN, OF COUNCIL, IDAHO, ASSIGNOR OF FORTY-NINE ONE-HUNDREDTHS TO WILBROD G. STE. MARIE, OF SHANIKO, OREGON.

NUT-LOCK.

1,302,105.　　　　　Specification of Letters Patent.　　Patented Apr. 29, 1919.

Application filed April 2, 1918. Serial No. 226,232.

*To all whom it may concern:*

Be it known that I, JAMES A. WARREN, a citizen of the United States, residing at Council, in the county of Adams and State of Idaho, have invented certain new and useful Improvements in Nut-Locks, of which the following is a specification.

This invention relates to improvements in nut locks, and has for one of its objects to improve the construction and increase the efficiency and utility of devices of this character.

With these and other objects in view, the invention consists in certain novel features of construction, as hereinafter shown and described and then specifically pointed out in the claim.

The improved device may be applied to bolts employed for various purposes, and it is not desired to limit the invention in this respect, but for the purpose of illustration the improved device is shown applied to one of the clamp bolts of a railway rail joint, to which it is more particularly applicable, and in the drawings thus employed.

Figure 1:
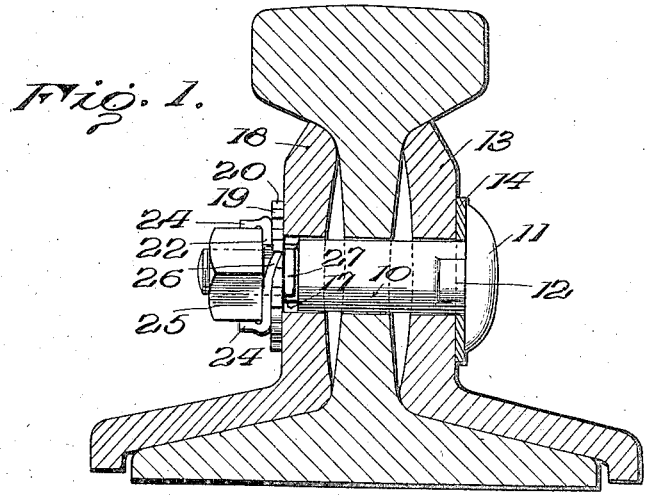
Figure 1 is a transverse section of a railway rail and the clamp plates of the joint with the improved device applied to one of the clamp bolts of the same.
Figure 2:
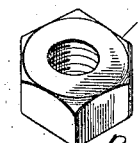
Fig. 2 is a detached perspective view of the nut.
Figure 3:
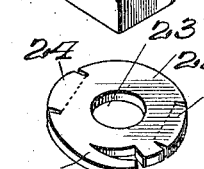
Fig. 3 is a detached perspective view of the nut locking member.
Figure 4:
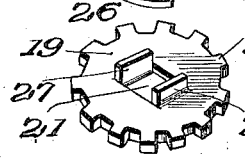
Fig. 4 is a detached perspective view of the toothed washer associated with the nut locking member.
Figure 5:
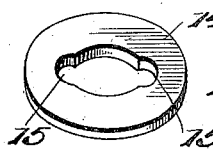
Fig. 5 is a detached perspective view of the washer employed beneath the head of the bolt.
Figure 7:
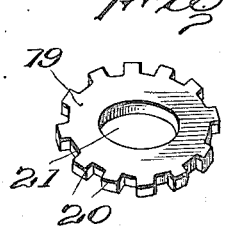
Fig. 7 is a detached perspective view of a modified form of the ratcheted or toothed washer.
Figure 8:
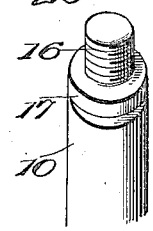
Fig. 8 is a detached perspective view of the modified form of bolt employed in connection with the modified form of the ratcheted washer.
Figure 6:
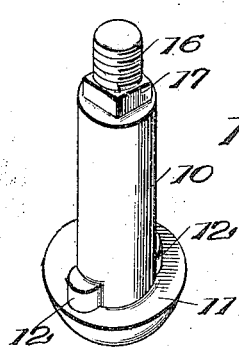
Fig. 6 is a detached perspective view of the bolt.

The bolt employed in the improved device comprises a stock portion 10 having a head 11 at one end and lugs 12 adjacent to the head to enter recesses in the bolt aperture of the adjacent clamp plate 13 to prevent rotary movement of the bolt. Between the bolt head 11 and the clamp member 13 is a washer 14 having lateral recesses 15 to receive the lugs 12, so that the washer is held from rotation upon the bolt. The threaded terminal 16 of the bolt is smaller in diameter than the body thereof, and between the threaded portion 16 and the body of the bolt is a portion 17 of other shape than round. In Figs. 1 and 6 the portion 17 is square, while in Fig. 8 the portion 17 is elliptical. The portion 17 may be of any shape other than round. Bearing against the clamp plate 18 is a stop washer represented as a whole at 19 and provided with marginal teeth 20. The washer 19 is provided with a central aperture corresponding to and engaging over the portion 17 of the bolt. The aperture 21 is preferably formed with protruding flanges 27 which engage the part 17 and increase the bearing surface between the washer and bolt. In Fig. 4 the washer 19 is shown with a square opening 21 to engage the squared portion 17, while in Fig. 7 the aperture 21 is formed elliptical to engage over the elliptical portion 17 of the bolt shown in Fig. 8. In constructing the improved device the aperture of the toothed ratcheted washer 19 will conform to the shape of the portion 17 of the bolt, whatever this shape may be. The washer 19 is thus held from turning on the bolt which is essential in the improved device.

Bearing upon the threaded portion 16 of the bolt is a locking plate 22 having a round opening to engage over the threads, and is thus rotatable upon the bolt. Formed in the plate 22, preferably at diametrically opposite points, are radial clefts in spaced relation, and forming tongue portions 24 adapted to be bent up against the sides of the nut 25 when the latter is applied, so that the member 22 is locked to the nut and rotates therewith. At one portion of the locking plate a tongue 26 is formed by cutting an L-shaped cleft through the material of the washer, and bending the metal released by the cleft to form a depending resilient pawl, the latter engaging the teeth 20 of the washer 19 one at a time, and thus locking the plate 22 and the nut held thereby from retrograde movement upon the bolt. The nut is thus effectually locked in position and will not work loose under the severe strains and jars to which the railway track is subjected when in use. The resilient pawl member 26 will slip over the teeth 20 when the nut is turned forwardly, and does not therefore prevent the tightening of the nut.

To remove the nut it is only necessary to force the spring pawl 26 from engagement with the teeth 20 by a suitable implement and without injuring the parts, so that the improved device may be used repeatedly.

The improved device is simple, can be manufactured at small expense, and applied to bolts of various sizes and to bolts employed for various purposes.

Having thus described the invention, what is claimed as new is:

In a device of the class described, a bolt having a portion other than round between the threads thereof and the body of the bolt, a stop member having marginal teeth and provided with an aperture, said stop member having protruding flanges adapted to engage the other than round portion of the bolt, a nut engaging member rotative relatively to the bolt and having means for locking the same to the nut, and a stop pawl carried by the nut engaging member and coacting with the teeth of the stop member.

In testimony whereof I affix my signature.

JAMES A. WARREN. [L. S.]

Copies of this patent may be obtained for five cents each, by addressing the "Commissioner of Patents, Washington, D. C."